2,945,883

Patented July 19, 1960

2,945,883

PROCESS FOR CONVERTING OPTICALLY ACTIVE AMINODIOLS INTO RACEMIC AMINODIOLS BY OXIDATION FOLLOWED BY RACEMIZATION

Carlo Giuseppe Alberti, Luigi Bernardi, Giovanni Larini, and Alberto Vercellone, all of Milan, Italy, assignors to Societa Farmaceutici Italia, Milan, Italy, a corporation of Italy No Drawing. Filed Aug. 14, 1956, Ser. No. 603,869

Claims priority, application Italy May 20, 1953

11 Claims. (Cl. 260—562)

Our invention relates to a process for converting optically active aminodiols into racemic amino-diols. It is a continuation-in-part of our copending application Serial No. 432,034, filed May 24, 1954, now abandoned.

It is known that chloramphenicol is a derivative of phenyl amino propanediol, namely D-threo-1-p-nitrophenyl-2-dichloroacetamido-1,3-propanediol, an optically active compound. Since synthesis methods always yield racemic compounds, in chloramphenicol synthesis it is necessary to carry out a resolution into the optical isomers of the intermediate at some stage of the synthesis, to obtain the corresponding isomer of the D-threo series of the final product chloramphenicol. If the intermediate chosen is a threo-phenyl aminopropanediol, of the two optical isomers obtained, D- and L-, it is the D-isomer that is employed for the further steps of the synthesis, the L-isomer being discarded. If the intermediate resolved is an erythro-phenyl aminopropanediol, it is the L-isomer that is employed and epimerized to a D-threo compound, the D-isomer being discarded.

As is evident to chemists, the utilization of the forms discarded will become possible if their racemization can be accomplished. However, every attempt made to obtain the racemization of said intermediates has failed. If racemization by heating is tried, the substance decomposes before it attains the racemization temperature; if other known methods of racemization are applied, they fail in the instant case.

The present invention derives from the following considerations: Phenylaminopropanediols corresponding to the general formula

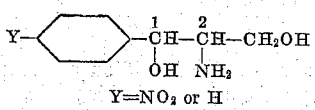

Y=NO₂ or H            (I)

have two asymmetrical carbon atoms; this is one of the reasons why they resist direct racemization. If one of the centres of asymmetry is removed it should be possible to obtain a substance (having only one centre of symmetry) which is susceptible of being racemized.

In fact by transforming the secondary alcoholic group of phenylaminodiols into a keto group, the asymmetry of the carbon atom in 1-position is removed and a substance is obtained which having only one asymmetric carbon atom, which is in α-position with respect to a keto group, is expected to be susceptible of being racemized. It is known that substances having one centre of symmetry adjacent to a group that mobilizes a hydrogen atom at the asymmetric carbon, are in the majority of cases racemizable.

For the transformation of the secondary alcoholic group of phenyl aminopropanediols into a keto group, the known method is to oxidize the N,O-diacyl derivatives of the phenyl aminopropanediols to obtain the α-acylamino-β-acyloxy propiophenones

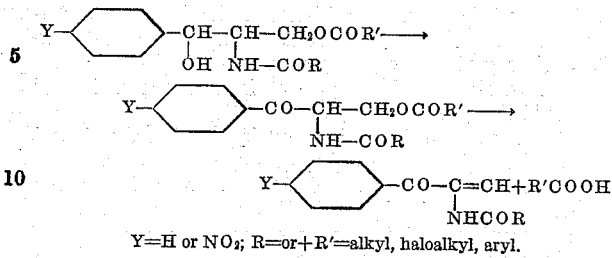

Y=H or NO₂; R=or+R'=alkyl, haloalkyl, aryl.

However we have found that in the α-acylamino-β-acyloxypropiophenones the disappearance of the rotatory power is not due to a racemization proper but is essentially due to the formation of a new compound, the α-acylamino-acrylophenone, in which the asymmetry centres have disappeared owing to the elimination of the acyloxy group in β-position, in the form of an acid, due to the union with the hydrogen in α-position, with the formation of a non-saturated compound having a double bond between the carbon atoms α and β. This transformation was recognized recently also on racemic derivatives.

It has been investigated by us thoroughly and we have found the conditions enabling us to obtain true racemization in lieu of said elimination.

We have found that by treating α-acylamino-β-hydroxypropiophenones corresponding to the general formula

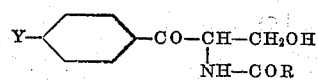

Y=H,NO₂; R=alkyl, haloalkyl, aryl)

instead of the α-acylamino-β-acyloxy-propiophenones, with substances of basic character in aqueous or organic or aqueous-organic medium, in solution or in suspension, at temperatures between 0° and 60° C., but preferably at room temperature (15–30° C.), contrary to the case with the corresponding α-acylamino-β-acyloxypropiophenones, there does not take place an elimination (of the corresponding hydroxy group) and formation of a double bond, but on the contrary a racemization.

As substances of basic character there may be employed inorganic substances such as alkali hydroxides, carbonates and bicarbonates, alkali phosphates etc. as well as organic substances such as primary, secondary and tertiary cyclic, heterocyclic and aliphatic amines (pyridine, diethylamine, piperidine, N-ethyl piperidine, triethylamine, etc.), alkali alcoholates and enolates, alkali salts of organic acids and various other basic agents even if not expressly mentioned herein. Strong alkaline agents (piperidine, N-ethylpiperidine, sodium alcoholate, etc.) are employed in small quantity, about 1%, or in larger amount (500 to 1000%) but for a short time (5–15 minutes); weak alkaline agents (pyridine, sodium bicarbonate, sodium acetate, etc.) require a longer time (1. to Days), but they yield purer products.

In particular, it has been found that sodium bicarbonate, better than the other catalysts, meets the requirements for practical employment, such as low cost, use of an aqueous suspension in lieu of a solution in an organic solvent, reasonably short reaction time (12 to 15 hours), high yield (97% of theory, against 88% with piperidine, 84% with N-ethyl piperidine, 80% with pyridine, 80% with sodium alcoholate).

The method of obtaining the α-acylamino-β-hydroxypropiophenones, which are to be subjected to racemization, is known. The method consists in saponifying cautiously the α-acylamino-β-acyloxy propiophenones with HCl and in N-monoacylating the hydrochloride of α-amino-β-hydroxy propiophenones.

However, we have found a more rapid method of obtaining the aforesaid D-α-acylamino-β-hydroxypropiophenones, namely by oxidizing directly and selectively the L-threo or the D-erythro N-acyl derivatives of phenyl-substituted aminopropane diols without acylating also the primary alcoholic group as would be necessary with conventional methods to protect it from the action of the oxidizing agent employed.

The process can be carried out by treating the N-acyl aminodiols with halogens in aqueous solution at a temperature between 0° C. and 50° C., preferably in the presence of actinic light. In lieu of the halogen there can be employed advantageously a compound setting free the halogen, in particular an alkali bromate, e.g. sodium bromate, in the presence of a little hydrobromic acid.

The N-acyl derivatives of phenyl-substituted aminopropanediols can be prepared in various known manners. For instance, they can be made by means of N-mono acylation of phenyl aminopropanediols with the chloride or the anhydride of an acid in Schotten-Baumann conditions; or by means of treatment, at mild temperature with only a slight excess of the anhydride of an acid, of phenyl-aminopropanediol; or by heating with the lower aliphatic ester, preferably the methyl ester, of an acid; or even by means of partial saponification of tri or di-acyl derivatives of phenyl amino propanediol with alkali hydroxides at mild temperature; or by treating the hydrochlorides of phenyl amino propane diols with the chlorides of the acids and subsequently treating the intermediate phenyl-amino diacyloxy hydrochlorides with alkali at pH>8.

In that way, the racemic α-acylamino-β-hydroxypropiophenones are obtained, which can be transformed into the corresponding aminodiols with known methods.

By racemizing the D-α-acylamino-β-hydroxypropiophenones, obtained by proceeding in the way set forth hereinbefore the racemic compounds are obtained.

These are reduced with hydrogen and catalysts, if the non-nitrated compounds are dealt with; if the nitro compounds are treated, reduction is carried out with aluminium isopropylate in isopropyl alcohol or with alkali boro-hydrides. The D,L-N-acyl phenylaminopropanediols are thus obtained in the threo and erythro forms, which are separated by fractional crystallization. The threo derivatives are saponified directly to D,L-threo-phenyl-amino-propanediols by heating them with diluted HCl. The erythro derivatives are first treated with SOCl₂ in the cold; a solution is obtained, which is then decomposed with water and heated to 100° C. for 30 minutes and thus yields the D,L-threo-phenylaminopropanediols. Another method of epimerization applicable here is treatment of the D,L-erythro-N-acyl phenyl-aminopropanediols with SOCl₂ in an inert diluent; the corresponding cyclic sulfates are formed which are heated to melting temperature to yield the D,L-transoxazolines; these are subjected to mild saponification, whereby the D,L-threo-N-acyl-phenylaminodiols are obtained.

The following reaction scheme illustrates the sequence of reactions to pass from the L-threo and D-erythro phenyl aminopropanediols to the D,L-threo phenyl aminopropanediols.

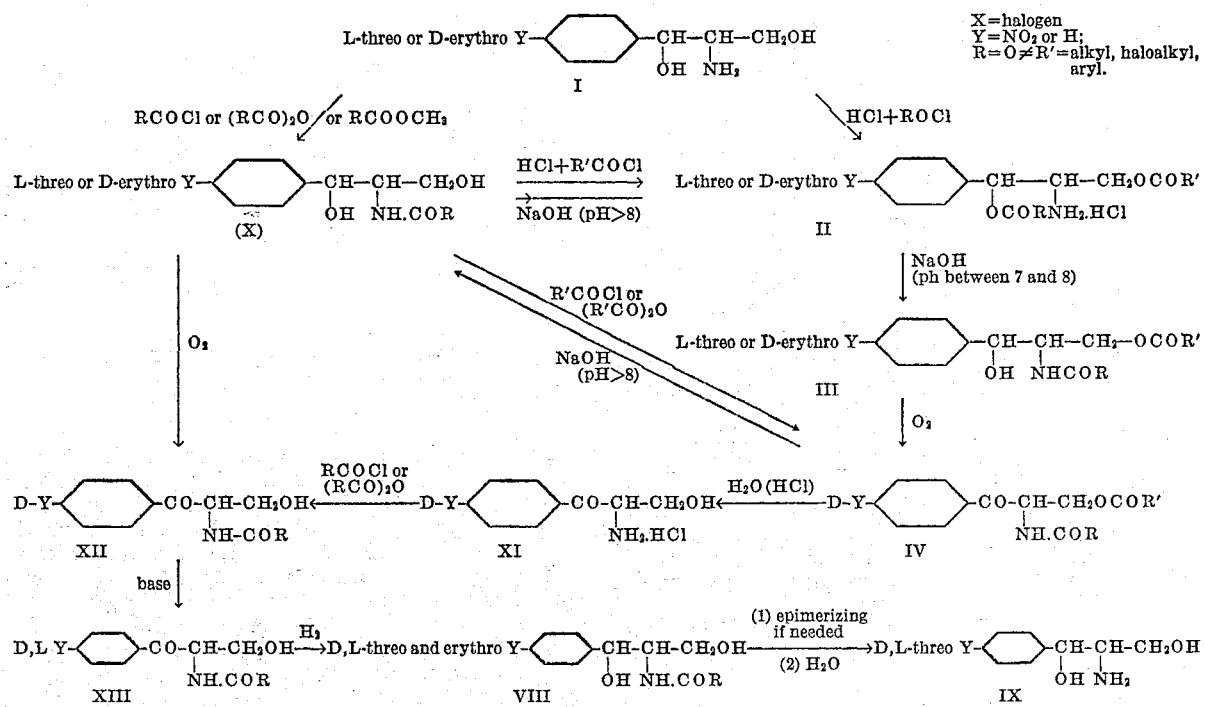

Some examples of this invention are recorded below, for illustrating although not limiting purpose, with reference to the general formulae for the reaction scheme.

*Example 1*

20.0 g. of L-threo-1-phenyl-1-2-amino-1,3-propanediol (I) are dissolved in 30 cc. of glacial acetic acid; 100 cc. of a saturated solution of hydrochloric acid in glacial acetic acid are added and afterwards 100 cc. of acetyl chloride, and the whole is let to stand overnight. Then the mixture is diluted with 500 cc. of ether to crystallize the L-threo-1-phenyl-1,3-diacetoxy-2-amino-propane hydrochloride (II), which is then filtered off. M.P. 153.5–154.5° C.; $(\alpha)_D = -13.8° \pm 3°$ (c.=4; methanol).

10.5 g. of L-threo-1-phenyl-1,3-diacetoxy-2-aminopropane hydrochloride (II) are dissolved in 21 cc. of water, and 3.6 g. of NaHCO₃ dissolved in 300 cc. of water are added at room temperature. The L-threo-1-phenyl-2-acetamino-3-acetoxypropane-1-ol (III), which crystallizes, is filtered off, M.P. 121–122° C. (from water); $(\alpha)_D = +6.7 \pm 1°$ (c.=4; methanol). 11.0 g. of L-threo-1-phenyl-2-acetamino-3-acetoxypropane-1-ol (III) are dissolved in 69 cc. of chloroform and oxidized with sodium bichromate and sulphuric acid in aqueous solution. D-α-acetamino-β-acetoxypropiophenone (IV) is obtained, M.P. 106–108° C. (from ethanol); $(\alpha)_D = -36.5$ (c.=4 methanol). 25.5 g. of D-α-acetamino-β-acetoxypropiophenone (IV) and 40 cc. of concentrated HCl diluted with 32 cc. of water are heated on a water bath till complete dissolution. This solution is vacuum distilled and the residue is taken up with methanol; the D-α-amino-β-hydroxy-propio-phenone (XI) hydrochloride crystallizes. M.P. 179–180° C.; $(\alpha)_D = -42.5 \pm 0.5$ (c.=2; methanol).

8 g. of hydrochloride as above described are dissolved in 70 g. of a mixture of water and ground ice, and 6.5 cc. of benzoyl chloride are added. At a temperature between 0° and 5° C., 10.5 g. of sodium acetate dissolved in 15 cc. of water are added, and the whole is stirred for three hours; the D-α-benzoylamino-β-hydroxy-propiophenone, when crystallizes is then filtered off. M.P. 138–140° (from ethanol); $(\alpha)_D = +32.5 \pm 1.5$ (c.=2:methanol).

10 g. of D-α-benzoylamino-β-hydroxy-propiophenone are dissolved in a pyridine-triethylamine mixture. After three hours the whole is poured into ice and concentrated hydrochloric acid and the D,L-α-benzoylamino-β-hydroxy-propiophenone, M.P. 141–142° C. (ethanol), is filtered off. 10 g. of D,L-α-benzoylamino-β-hydroxypropiophenone, after addition of a small amount of Raney nickel in 100 cc. of methanol, are hydrogenated at 10 at. until the hydrogen absorption is completed. The catalyst is filtered off and then the ethanol solution is concentrated in order to crystallize the residue, which consist of a mixture of D,L-threo-and erythro-1-phenyl-2-benzoylamino 1,3-propanediol, from which, by crystallization from ethanol water, the D,L-threo-1-phenyl-2-benzoylamino-1,3-propanediol, M.P. 165–167° C., is separated; the latter, saponified by boiling with 20% HCl, gives D,L - threo - 1 - phenyl - 2-amino-1,3-propane diol, M.P. 82–84° C.

*Example 2*

10 g. of L-(+)-1-p.nitrophenyl-2-amino-1,3-propanediol (I) are suspended in 24 cc. of saturated hydrochloric acid solution in acetic acid (about 11%) and 16 cc. of acetyl chloride are added. After a night the L-(+)-1-p.nitrophenyl-1,3-diacetoxy-2-amino propane-hydrochloride (II) is filtered off and purified by crystallizing from methanol-ether. M.P. 170–172°; $(\alpha)_D = +6.5°$ (c.=4.18; methanol). 13 g. of L-threo-1-p.nitrophenyl-1,3-diacetoxy-2-amono propane hydrochloride (II) are dissolved in 100 cc. of water; 120 cc. of acetone and further at 0° 25 cc. of NaH N/2 are added. After 2 hours at 0° it is neutralized with HCl N/1 and acetone is vacuum distilled. By extraction with ethyl acetate subsequently the L-threo-1-p.nitro-phenyl-2-acetamino-1,3-propanediol (X) is obtained M.P. 134–136° $(\alpha)_D = -7.65$ (c.=5.22; ethanol). 5 cc. of bromine are added under sunlight while stirring at 30° C. to 25.0 of L-threo-£-p.nitrophenyl-2-acetamino-1,3-propanediol (X) dissolved in 200 cc. of water. Extraction is made with ethyl acetate, and from the ethylacetate solution the D-p.nitro-α-acetamino-β-hydroxy-propiophenone (XII) is obtained by evaporation. M.P. 142–144° $(\alpha)_D = +32°$ (c.=13; pyridine) or =+22.5° (c.=2.0; ethanol). This ketol is obtained also by heating on water bath a mixture of 30 g. of D-p.nitro-α-acetamido-β-acetoxy-propiophenone and 40 cc. of concentrated HCl diluted in 32 cc. of water. As soon as dissolution is over, it is cooled in order to crystallize the hydrochloride of D-p.nitro-α-amino-β-hydroxy-propiophenone (XI) M.P. $(\alpha)_D = -55°$ (c.=4; H₂O). 17 g. of this hydrochloride are mixed with 50 cc. of water; 100 g. of ice and 8 cc. of acetic anhydride, and then a solution of 22 g. of crystallized sodium in 30 cc. of water is added. The D-p.nitro-α-acetamido-β-hydroxy-propiophenone (XII) crystallizes. M.P. 142–144° 5 g. of D-α-acetamido-β-hydroxy-p.nitropropiophenone (XII) M.P. 142–144°; $(\alpha)_D = +32°$ (c.=13; pyridine) are dissolved in 40 cc. of anhydrous pyridine and let to standing at room temperature (about 20° C.) for 140 hours. From the beginning it can be noticed, by sample control that rotatory power decreases in a logarithmic way. When the racemization is advanced, the D,L-α-acetylamino-β-hydroxy-p.nitropropiophenone (XIII) begins to separate in the form of small yellowish crystals which, at the end of the operation, are collected, washed with a little ether and dried in air.

Alternatively the compound X may be transformed into XII, and XII into XIII, in the following ways:

10 g. of L-threo-1-p.nitrophenyl-2-acetamino-1,3-propane-diol (X) and 2.2 g. of sodium bromate are dissolved in 120 cc. of water in a flask, and 0.6 g. of 48% hydrobromic acid are added.

The solution is left to stand in the sunlight for one day, then the crystallized D-p.nitro-α-acetamino-β-hydroxy-propiophenone (XII), M.P. 140–142°, is filtered off. 10 g. of D-p.nitro-α-acetamino-β-hydroxy-propiophenone (XII) are suspended in 150 cc. of a 5% sodium bicarbonate solution and stirred from time to time. The solution is left to stand overnight, then the D,L-p.nitrophenyl - α - acetamino-β-hydroxy-propiophenone (XIII) M.P. 158–159° C., is filtered off; or 2.5 of D-p.nitrophenyl-α-acetamino-β-hydroxy-propiophenone (XII) (M.P. 142–144°); $(\alpha)_D = +22.5°$ (c.=2; ethanol) are dissolved in 20 cc. of ethanol and 75 cc. of N-ethylpiperidine. After a few minutes the D,L-p.nitrophenyl-α-acetamino-β-hydroxy-propiophenone (XIII) begins to separate, showing that racemization has been performed, in the form of small yellow crystals. After 3 hours they are collected and washed with little ether. M.P. 160–163°; or 2.5 g. D-p.nitrophenyl-α-acetamino-β-hydroxy-propiophenone (XII) (M.P. 142–144°); $(\alpha)_D = +22.5°$ (c.=2; ethanol) are dissolved in 25 cc. of piperidine. A deep red coloration appears. After 5 minutes this solution is poured into 100 g. of ice and 100 cc. concentrated hydrochloric acid. Small yellowish crystals of D,L-p.nitrophenyl-α-acetamino-β-hydroxy-propiophenone (XIII) separate, which are collected and dried. M.P. 164–166°; or 2.5 g. of D-p.nitrophenyl-α acetamino-β-hydroxy-propiophenone (XII) (M.P. 142–144°) $(\alpha)_D = +22.5°$ (c.=2; ethanol) are dissolved in 140 cc. of absolute ethanol and subsequently 10 cc. of an ethanol solution of sodium ethylate (obtained by dissolving 0.25 g. of sodium in 100 cc. of ethanol) are added in the cold. At once a deep red coloration appears. After 5 min. it is neutralized with acetic acid, ethanol is vacuum evaporated and purification is performed by crystallization from dioxane. The D,L-p.nitro-phenyl-α-acetamino-β-hydroxy-propiophenone (XIII) is obtained. M.P. 162–163°.

25.2 g. of D,L-p.nitro-α-acetamino-β-hydroxy-propiophenone (XIII) are suspended in 80 cc. of methanol (made free from acid) and 2 g. of 91% potassium borohydride dissolved in 10 cc. of boiled water are added while stirring and keeping a temperature range from 25 to 30° C. After 20 min. 4 cc. of concentrated HCl are added and the erythro - 1 - p.nitrophenyl - 2 - acetamino - 1,3-propanediol (VIII) is allowed to crystallize. It has a M.P. 184–185° and after purification melts at 195° C.

Crystallization mother liquors are evaporated to dryness and the residue is extracted with ethyl acetate. By concentration of the ethyl acetate solution the threo-1-p.nitrophenl-2-acetamino-1,3-propanediol (VIII) is obtained; M.P. 157–162, and 166° after recrystallization.

*Example 3*

For further illustration of the racemization of p-nitro-α-acylamino-β-hydroxypropiophenone, the following examples are given wherein the starting compounds have been obtained from D-p-nitro-α-acetamino-β-acetoxypropiophenone in a manner substantially analogous to that described in Example 1 for D-α-benzamino-β-hydroxypropiophenone from D-α-acetamino acetoxypropiophenone.

5 g. of D-p.nitrophenyl-α-propioamino-β-hydroxy-propiophenone (XII) (M.P. 135–136°); $(\alpha)_D = -26.5°$ (c.=4; ethanol) are dissolved at room temperature in 30 cc. of piperidene. After 5 min. the solution is poured into 100 g. of ice and 100 cc. of concentrated hydrochloric acid. The D,L-p.nitrophenyl-α-propioamino-β-hydroxy-propiophenone (XII) separates in the form of a glue which soon crystallizes. It is collected and dried. M.P. 115–116.

4 g. of D-p.nitrophenyl-α-chloroacetamino-β-hydroxy-propiophenone (XII) (M.P. 101–102°); $(\alpha)_D = +6.4°$ (c.=4; acetone) are dissolved at room temperature in 25 cc. of pyridine. When rotatory power has disappeared the solution is poured into 100 g. of ice and 75 cc. of concentrated hydrochloric acid. Thus the D,L-p.nitrophenyl - α - chloroacetamino - β - hydroxy - propiophenone (XIII) separates. M.P. 128–130° C.

3 g. of D-p.nitrophenyl-α-benzamino-β-hydroxy-propiophenone (XII) M.P. 149–150°; $(\alpha)_D = +60°$ (c.=2; acetone) are dissolved at room temperature in 30 cc. of piperidine. After 10 min. the solution is poured into ice and concentrated hydrochloric acid. The D,L-p.nitrophenyl-α-benzamino-β-hydroxy-propiophenone (XIII) separates in the form of small crystals. M.P. 157–159°.

We claim:

1. The process which comprises treating a compound of the formula

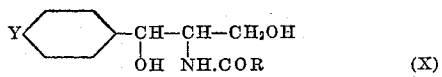 (X)

wherein Y is a radical of the group consisting of H and $NO_2$, and the COR group is an acyl radical taken from the group consisting of benzoyl, acetyl, propionyl, and monochloracetyl, with an agent of the class consisting of bromine and alkali metal bromates in aqueous solution at a temperature between 0° and +50° C., to obtain a compound of the formula

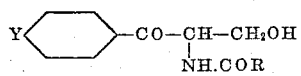

2. The process of claim 1, in which said treatment is carried out in the presence of actinic light.

3. The process of claim 2, in which said treatment is carried out in the presence of hydrobromic acid.

4. The process of claim 3, in which said alkali metal bromate is sodium bromate.

5. A process which comprises oxidizing a compound of the class consisting of the D- and L-isomers of the compounds of the formula

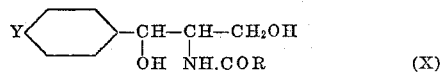 (X)

wherein COR is a radical of the group consisting of benzoyl, acetyl, propionyl, and monochloroacetyl, and Y represents a radical of the group consisting of H and $NO_2$, with an agent of the class consisting of bromine and alkali metal bromates, in aqueous solution, and subjecting the so obtained correspondingly optically active compound of the formula

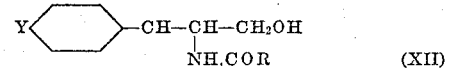 (XII)

to racemization by treating with a basic racemizing material, to obtain the said racemic intermediate which is of the formula

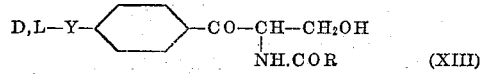 (XIII)

6. The process defined in claim 5, in which the basic racemizing material is taken from the group consisting of pyridine, piperidine, triethylamine, N-ethyl-piperidine, sodium alcoholate, sodium bicarbonate, and sodium acetate.

7. The process which comprises oxidizing a compound of the class consisting of the D- and L-isomers of the compounds of the formula

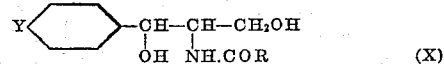 (X)

wherein COR is an acyl radical which provides a stable blocking group in the process, the R radical being taken from the group consisting of alkyl, aryl, and halogenated alkyl, and Y represents a radical of the group consisting of H and $NO_2$, with an agent of the class consisting of bromine and alkali metal bromates, in aqueous solution, and subjecting the so obtained correspondingly optically active compound of the formula

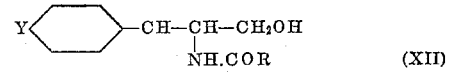 (XII)

to racemization by treating with a basic racemizing material, to obtain the said racemic intermediate which is of the formula

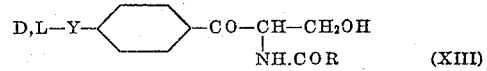 (XIII)

8. The process defined in claim 7 in which the basic racemizing material is taken from the group consisting of pyridine, piperidine, triethylamine, N-ethyl-piperidine, sodium alcoholate, sodium bicarbonate, and sodium acetate.

9. The process which comprises oxidizing a compound of the class consisting of the D- and L-isomers of the compounds represented by the formula

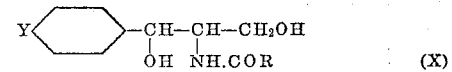 (X)

wherein COR is a radical of the group consisting of benzoyl, acetyl, propionyl, and monochloroacetyl, and Y represents a radical of the group consisting of H and $NO_2$, with a stoichiometric amount of sodium bromate in aqueous solution, in the presence of actinic light and hydrobromic acid, at a temperature of from 0° to +50° C., and subjecting the so obtained correspondingly optically active compound of the formula

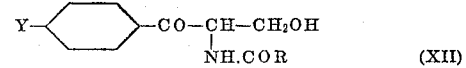 (XII)

to direct racemization by treating with aqueous sodium bicarbonate at a temperature not above 60° C., to obtain the said racemic intermediate, which is of the formula

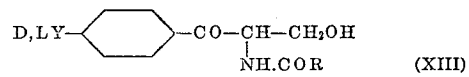 (XIII)

10. The process comprising oxidizing a compound of the formula

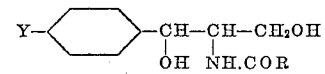

to a compound of the formula

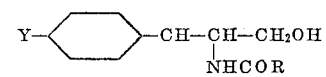

by treating the former with an agent of the class consisting of bromine and alkali metal bromates, in aqueous solution, Y being a radical of the group consisting of H and $NO_2$ and the COR group being an acyl radical which provides a stable blocking group in the process.

11. The process which comprises oxidizing a 1-phenyl-2 hydroxy-3-acylamine-4 hydroxy propane compound to an α-acylamino-β-hydroxy-propiophenone by treating the former compound with an agent of the class consisting of bromine and alkali metal bromates, in aqueous solution, said former compound having no other substituents in the 2, 3 and 4 positions.

References Cited in the file of this patent

UNITED STATES PATENTS 2,143,383    McNamee et al. _____ Jan. 10, 1939

OTHER REFERENCES

Richter: Organic Chemistry, vol. I (1944), p. 393.

Alberti et al.: Gazz. Chim. Ital., vol. 82 (1952), pp. 53, 56, 57, 60 and 62.

Alberti et al.: La Chioca el' Industria, vol. 33 (1951), pp. 7–8.

Gilman: Organic Chemistry, vol. 2 (1938), pp. 872 and 873.

Fieser and Fiser: Organic Chemistry (1950), pp. 272 to 273.

Scoffone et al.: Gazz. Chimica. Italiana, vol. 81, pp. 881–890 (1951).

Vigneaud et al.: Jour. Bio. Chem., vol. 98 (1932), pp. 295–308.

Vigneaud et al.: Jour. Bio. Chem., vol. 99 (1932), pp. 143–151.

UNITED STATES PATENT OFFICE

CERTIFICATION OF CORRECTION

Patent No. 2,945,883                                July 19, 1960

Carlo Giuseppe Alberti et al.

It is hereby certified that error appears in the above numbered patent requiring correction and that the said Letters Patent should read as corrected below.

In the heading to the printed specification, line 10, date of priority, for "May 20, 1953" read -- May 30, 1953 --.

Signed and sealed this 25th day of April 1961.

(SEAL)
Attest:

ERNEST W. SWIDER
Attesting Officer

DAVID L. LADD
Commissioner of Patents